United States Patent
Blank et al.

(10) Patent No.: US 8,842,130 B1
(45) Date of Patent: Sep. 23, 2014

(54) AUTOMATED COLOR AUTHORING

(75) Inventors: Gil Blank, Morris Plains, NJ (US); Gregory James Nyssen, Seattle, WA (US); Jules Cook Graybill, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 201 days.

(21) Appl. No.: 13/370,439

(22) Filed: Feb. 10, 2012

(51) Int. Cl.
*G09G 5/02* (2006.01)
*G06F 17/30* (2006.01)

(52) U.S. Cl.
CPC .................................. *G06F 17/3025* (2013.01)
USPC .......................................... 345/593; 345/595

(58) Field of Classification Search
CPC .................................................. G06F 17/3025
USPC .................................................... 345/595
See application file for complete search history.

(56) References Cited

U.S. PATENT DOCUMENTS 7,679,786 B2 *  3/2010  Scott et al. .................... 358/2.1
2004/0049309 A1 *  3/2004  Gardner et al. ............... 700/132

* cited by examiner

*Primary Examiner* — David T Welch
*Assistant Examiner* — Jitesh Patel
(74) *Attorney, Agent, or Firm* — Thomas | Horstemeyer, LLP

(57) ABSTRACT

Disclosed are various embodiments for performing automated color authoring for images of items having multiple color variations. A photographically captured source image of an item is obtained. The source image corresponds to one color variation of the item. A selection mask defining the item in the source image is obtained. A target image of the item corresponding to another color variation is generated by automatically transforming the item defined by the selection mask in the source image to the other color variation based at least in part on data obtained from multiple previous manual color variation transformations for multiple other items.

21 Claims, 4 Drawing Sheets

AUTOMATED COLOR AUTHORING

BACKGROUND

Products are often offered with several variations. For example, a particular garment may be available in multiple colors, patterns, fabrics, etc. A product catalog may include images depicting one or more variations of the product.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to automated color authoring to provide multiple images of an item, where the multiple images represent multiple color variations of the item. In developing a product catalog for clothing, for example, it may be cost prohibitive to photograph a model wearing each color variation of a garment which is offered in multiple color variations. Model photography time is expensive due to labor and other costs. Models, photographers, stylists, hair and makeup artists, art directors, talent coordinators, and other personnel all may be compensated for their time. Accordingly, it may make more sense for one color variation of the garment to be photographed on the model, and then have graphic artists manipulate the image to create additional images representing the other color variations.

However, this process, referred to herein as color authoring, may involve many manual tweaks and may be time consuming. Automated tools in image manipulation software are not capable of performing this color authoring in an acceptable manner. Such tools provide inconsistent results and are not scalable. For instance, a "paint bucket" tool cannot acceptably transform the color of a garment in a photograph due to the many different shades of the color that are present (e.g., shadows, highlights, mid-ranges, and so on). Consequently, color authoring may involve a graphic artist performing many different manual tasks using several tools to achieve a desired result, which draws upon the subjective opinion, technical skill level, and experience of the graphic artist.

Various embodiments of the present disclosure provide a form of automation to the process of color authoring. A large data set conceivably unprecedented in scale and relating to previous manual color authoring is collected. Machine learning techniques are applied to this data set in order to automate the process of transforming one color variation of an item into other color variations. A beneficial multiplier effect is achieved, whereby an automated solution produces results that are simultaneously technically superior, more consistent, and objectively accurate as to the colors of the items being color authored. Although specific examples are provided herein relating to garments including clothing and shoes, it is understood that the principles of the present disclosure are applicable to other items such as household goods, furniture, vehicles, and/or other goods which are offered in multiple color variations. In the following discussion, a general description of the system and its components is provided, followed by a discussion of the operation of the same.

Figure 1:
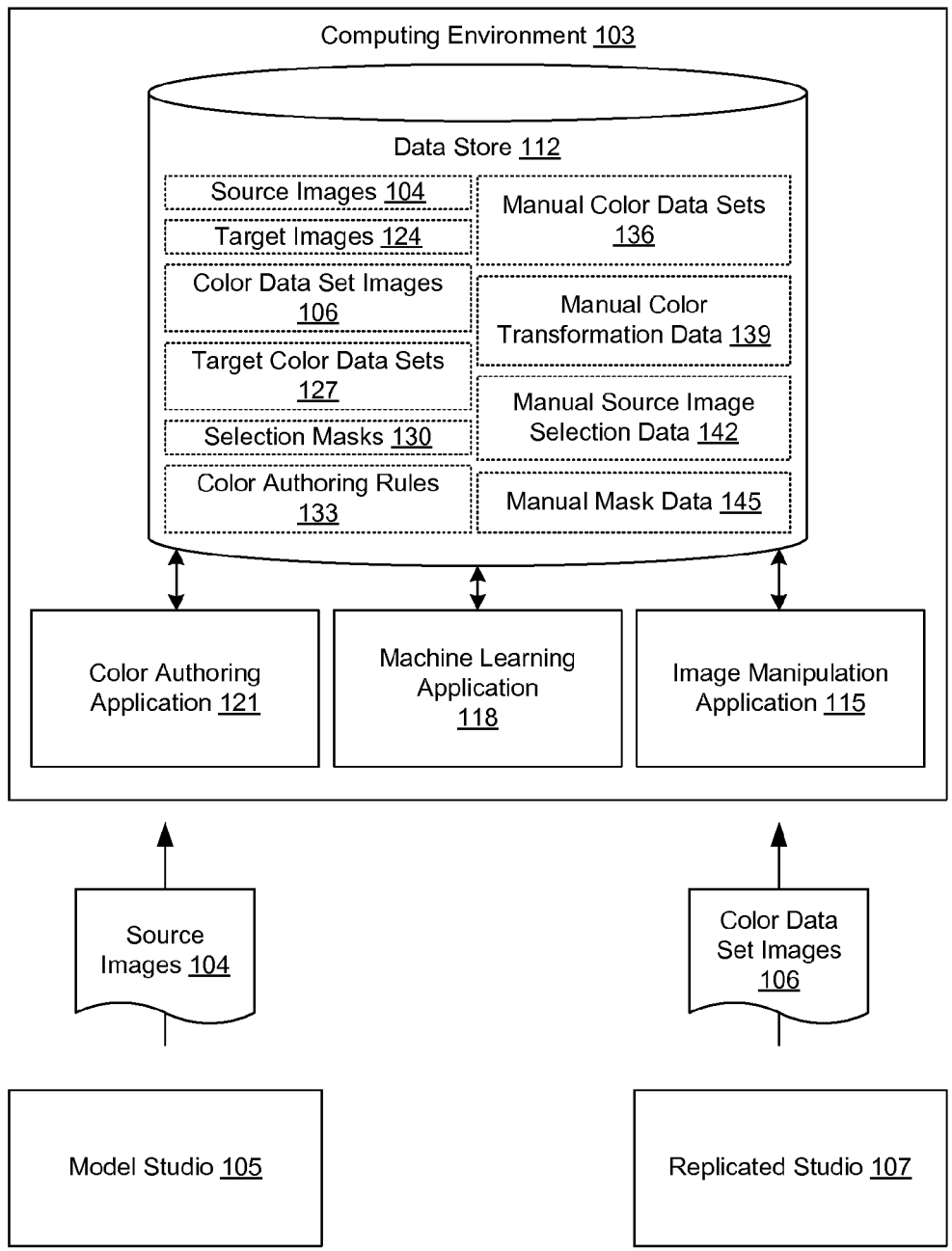
FIG. 1 is a drawing of an image generation environment according to various embodiments of the present disclosure.

With reference to FIG. 1, shown is an image generation environment 100 according to various embodiments. The image generation environment 100 includes a computing environment 103, which may obtain source images 104 from a model studio 105 and color data set images 106 from a replicated studio 107.

The computing environment 103 may comprise, for example, a server computing device, a client computing device, or any other system providing computing capability. In some embodiments, a plurality of computing devices may be employed that are arranged, for example, in one or more server banks or computer banks or other arrangements. Such computing devices may be located in a single installation or may be distributed among many different geographical locations. For example, the computing environment 103 may comprise a cloud computing resource, a grid computing resource, and/or any other distributed computing arrangement. The computing environment 103 may incorporate one or more networks such as, for example, the Internet, intranets, extranets, wide area networks (WANs), local area networks (LANs), wired networks, wireless networks, or other suitable networks, etc., or any combination of two or more such networks.

The computing environment 103 may incorporate one or more client computing devices, which may be embodied in the form of a desktop computer, a laptop computer, personal digital assistants, cellular telephones, smartphones, set-top boxes, music players, web pads, tablet computer systems, game consoles, electronic book readers, or other devices with like capability. Such client computing devices may include one or more display devices such as, for example, one or more devices such as cathode ray tubes (CRTs), liquid crystal display (LCD) screens, gas plasma-based flat panel displays, LCD projectors, or other types of display devices, etc.

Various applications and/or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112, for example, is associated with the operation of the various applications and/or functional entities described below.

The components executed on the computing environment 103, for example, include an image manipulation application 115, a machine learning application 118, a color authoring application 121, and other applications, services, processes, systems, engines, or functionality not discussed in detail herein. The image manipulation application 115 is executed to facilitate creation and editing of images. Such images may correspond, for example, to bitmaps, tagged image file format (TIFF) files, Joint Photographic Experts Group (JPEG) files, graphics interchange format (GIF) files, portable network graphics (PNG) files, and/or other forms of images. The image manipulation application 115 may correspond to a commercially available image manipulation application 115 such as, for example, Adobe® Photoshop®, Corel® PaintShop® Pro, GNU Image Manipulation Program (GIMP), and so on. The image manipulation application 115 may facilitate manual color authoring by way of various tools such as, for example, a hue-saturation-brightness adjustment tool, selection tools, color balance tools, color replacement tools, contrast adjustment tools, and/or other tools. The image manipulation application 115 may be instrumented with monitoring code to track various manual operations related to selection mask creation, color authoring, source image selection, and/or other manual operations.

The machine learning application 118 is executed to process the data generated from the various manual image manipulation operations in order to create various rules to guide automated color authoring by the color authoring application 121. The color authoring application 121 is executed to perform automated color authoring tasks based at least in part on data generated by the machine learning application 118. Such color authoring tasks may include, for example, selection of a source image, creation of a selection mask, transformation of a color range in the selection mask to another color range, and so on.

The data stored in the data store 112 includes, for example, source images 104, target images 124, color data set images 106, target color data sets 127, selection masks 130, color authoring rules 133, manual color data sets 136, manual color transformation data 139, manual source image selection data 142, manual mask data 145, and potentially other data. The source images 104 correspond to photographically captured images of an item from the model studio 105. In some cases, the source images 104 may correspond to images of a garment which have been shot "on model," i.e., being worn by a human model. The source images 104 may correspond to one or more color variations for the item.

The target images 124 correspond to color authored images which are generated by the color authoring application 121, potentially in conjunction with the image manipulation application 115. That is, the target images 124 correspond to manipulated versions of the source images 104 which are intended to depict other color variations of the item. As a non-limiting example, where the item is a shirt, the source image 104 for the item may correspond to a middle-gray version of the shirt, and the target images 124 for the item may be an orange version of shirt, a blue version of the shirt, a green version of the shirt, etc.

The color data set images 106 correspond to photographically captured images of versions of the item from within the replicated studio 107. The replicated studio 107 is set up to replicate the lighting, camera, and/or other characteristics of the model studio 105 but without the human models and/or other staff. The color data set images 106 may be used to determine colors for the color variations corresponding to the target images 124 for an item. The target color data sets 127 comprise data indicating the colors for the color variations of the item. The target color data sets 127 may be manually generated or automatically generated from the color data set images 106 (and potentially manually adjusted).

The selection masks 130 correspond to pixel selections within the source images 104 which represent the item. For example, the selection masks 130 may include pixels corresponding to the colored portion of a garment but exclude pixels corresponding to the skin of the human model, the background, buttons or other pixels that do not vary in color across color variations of the item, etc. Such selection masks 130 may be manually defined or automatically generated and potentially manually adjusted.

The color authoring rules 133 correspond to the output from the machine learning application 118. The color authoring rules 133 guide the color authoring application 121 in automating various tasks related to color authoring. The manual color data sets 136 records manual tasks performed relating to creation of target color data sets 127 for multiple color variations of multiple items. The manual color transformation data 139 records manual tasks performed relating to color transformations for multiple color variations of multiple items. The manual source image selection data 142 records manual tasks performed relating to selection of a source image 104 from among multiple source images 104 of an item. The manual mask data 145 records manual tasks performed relating to creation of selection masks 130 for source images 104 of multiple items.

Next, a general description of the operation of the various components of the image generation environment 100 is provided. To begin, various source images 104 of items being modeled are photographed in the model studio 105. The source images 104 are transferred or imported to the data store 112. Users, such as graphic artists, perform manual color authoring using the image manipulation application 115. The image manipulation application 115 is instrumented to record the various manual tasks performed by the users during the process of manual color authoring.

During manual color authoring, the user selects a source image 104 for an item, potentially from multiple source images 104 of the item. The user may select the source image 104, for example, based on the type of color variation depicted in the source image 104. For example, a middle-gray or pastel color may be better for the purpose of color authoring than a solid black or a solid white color variation. The user may also select source images 104 based on quality and/or other subjective factors. With some items, the user may select multiple source images 104. For example, one source image 104 may be most appropriate for color authoring multiple target images 124, while another source image 104 of the item may be most appropriate for color authoring one or more other target images 124. Data relating to the selection of the source image 104 (i.e., inputs to the user and the output selection) may be stored in the manual source image selection data 142. In some cases, a user may determine that the item is not color authorable at all, e.g., if the item is a garment having an unusual fabric type, a complex pattern, and so on.

Once a source image 104 is selected, the user creates a selection mask 130 for the item modeled in the source image 104. The selection mask 130 may include, for example, only pixels of the item that are to be changed in color. In some cases, this may relate to a portion of the item (e.g., certain color stripes or other portions). Thus, the selection mask 130 may exclude, for example, background pixels, pixels corresponding to the model, pixels corresponding to the item which are not to be color adjusted, and so on. Data relating to the creation of the selection mask 130 (i.e., inputs to the user and the output mask) may be stored in the manual mask data 145.

Manual color authoring continues with the user transforming pixels encompassed by the selection mask 130 to a different range of color values. For example, the user may adjust the hue, color balance, brightness, contrast, and/or perform other manual transformations. The transformations may be performed in various color spaces as desired. The user may perform the transformations to achieve a color variation for the item as depicted in a color data set image 106 photographically captured in the replicated studio 107. The user may then save the color authored image(s) as target images 124. Data relating to the manual creation of the target images 124 may be stored in the manual color transformation data 139. To the extent that a user may select a color range from a color data set image 106, that information may be stored in the manual color data sets 136.

After manual color authoring has been performed for a large data set of source images 104 for multiple items, the machine learning application 118 may be executed to generate the color authoring rules 133 to guide an automated color authoring process. The machine learning application 118 uses the large data set to determine how the users have been transforming inputs (e.g., one range of color values) to outputs (e.g., another range of color values). The data set may include other information relating to the manual color authoring such as, for example, brands, fabric types, color names, and so on. The output of the machine learning application 118 may be used to automate various color authoring tasks with the color authoring application 121. The automated tasks that may be performed by the color authoring application 121 will now be described with reference to FIG. 2.

Figure 2:
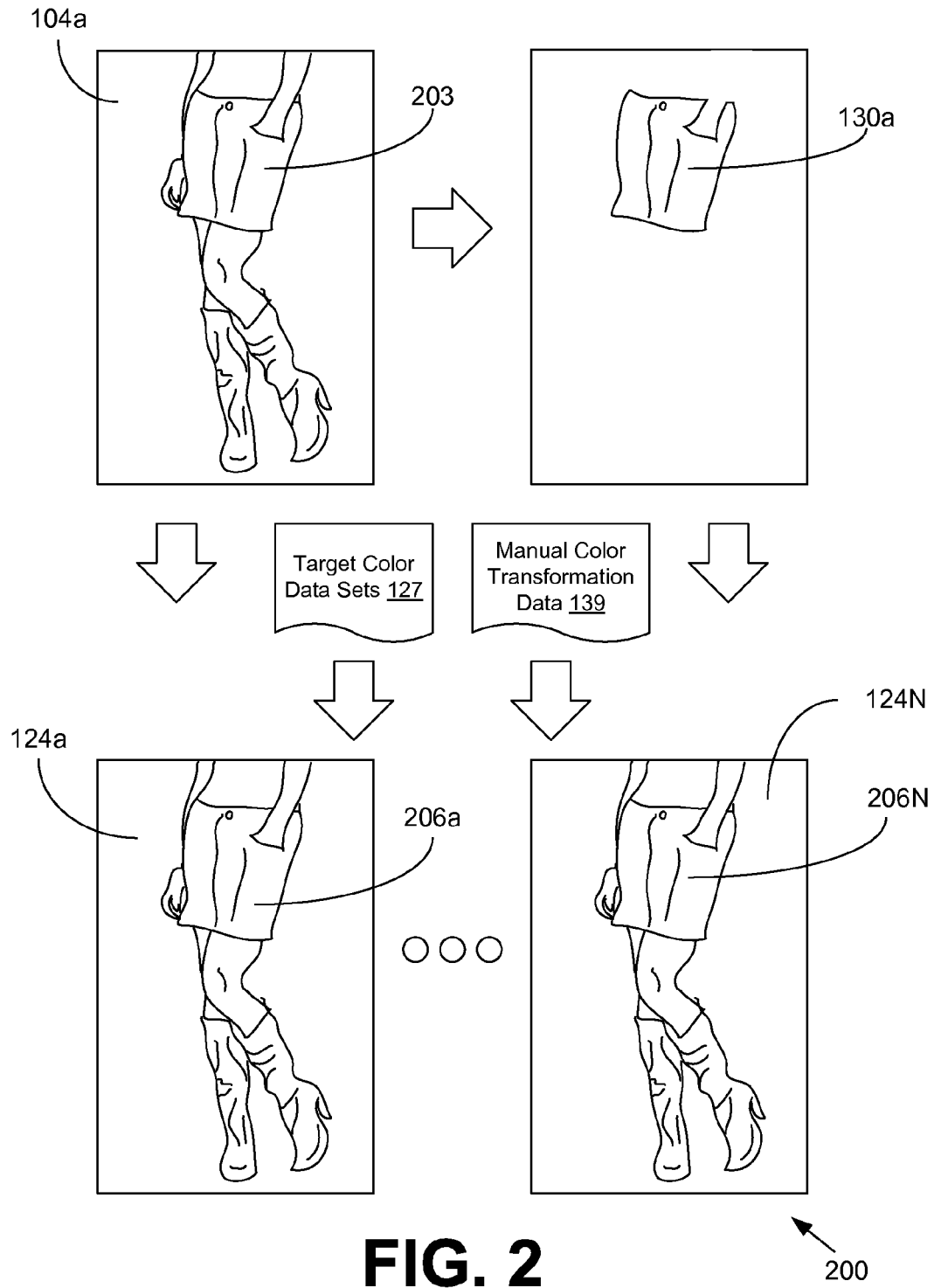
FIG. 2 is a diagram depicting an example of an image transformation being performed in the image generation environment of FIG. 1 according to various embodiments of the present disclosure.

Turning now to FIG. 2, shown is an example of an image transformation being performed in the image generation environment 100 (FIG. 1) according to various embodiments of the present disclosure. To begin, one or more source images 104 (FIG. 1) are acquired from the model studio 105 (FIG. 1). The user may manually select one of the source images 104, or the color authoring application 121 (FIG. 1) may select a source image 104 automatically using the color authoring rules 133 (FIG. 1) which are based at least in part on the manual source image selection data 142 (FIG. 1). Here, a source image 104a showing a model wearing a garment 203 is selected.

Next, a selection mask 130a is created from the source image 104a. The selection mask 130a corresponds to pixels of the garment 203 which are to be modified in color. The user may create the selection mask 130a manually, or the color authoring application 121 may generate the selection mask 130a automatically using the color authoring rules 133 which are based at least in part on the manual mask data 145 (FIG. 1). In some cases, the user may edit or tweak an automatically generated selection mask 130a. Multiple selection masks 130a may be created for situations in which the garment 203 has multiple colors which are to be modified.

After the selection mask 130a is created, the source image 104a may be transformed automatically by the color authoring application 121 into a plurality of target images 124a . . . 124N. Each target image 124 includes a respective color authored garment 206a . . . 206N corresponding to different color variations of the same garment 203. The color variations of the target images 124 are specified by the target color data sets 127 (FIG. 1). The target color data sets 127 may be manually defined by the user for the specific garment 203 or may be automatically determined based at least in part on color data set images 106 (FIG. 1) of different versions of the garment 203. A target range of color values for the item may be determined from a color data set image 106 based at least in part on the background color of the item in the source image 104a. The automatic determination may be made by the color authoring application 121 using the color authoring rules 133, which may be based at least in part on the manual color data sets 136 (FIG. 1). In some cases, the target color data sets 127 may be determined based at least in part on a color name, a brand, and/or other information associated with the color variations.

When the target color data sets 127 are ascertained, the color authoring application 121 performs a color transformation of the pixels selected by the selection mask 130a. The transformation may be guided by color authoring rules 133 based at least in part on manual color transformation data 139 (FIG. 1). The transformation may, for example, make adjustments in the hue-saturation-brightness color space and/or other color spaces. The transformation may make adjustments, for example, to shadows, mid-range colors, highlights, and/or other tones. The goal of the transformation is to produce realistic target images 124 which may be indistinguishable from source images 104 that show actual versions of the garment 203 having the particular color variation.

In some embodiments, the color authoring application 121 may directly create the target images 124 as described. In other embodiments, the color authoring application 121 may control various tools of the image manipulation application 115 (FIG. 1) to produce the result. In still other embodiments, the color authoring application 121 may output instructions to the user in order to achieve the result using the image manipulation application 115.

Although the color authoring has been described herein as pertaining to particular images, it is understood that the principles of the present disclosure are applicable to video of items as well. For example, an online retailer may wish to include videos of a garment being worn by a model, where the model turns around in the video to provide a complete view of the garment. It may be desirable to color author multiple videos corresponding to multiple color variations of the garment to avoid having to create additional videos with the model. Because video corresponds to a sequence of images, the automated color authoring performed by the color authoring application 121 may also be applied in the context of video. Thus, the source image 104 may correspond to a frame of a source video, and the target image 124 may correspond to a frame of a target video.

Figure 3:
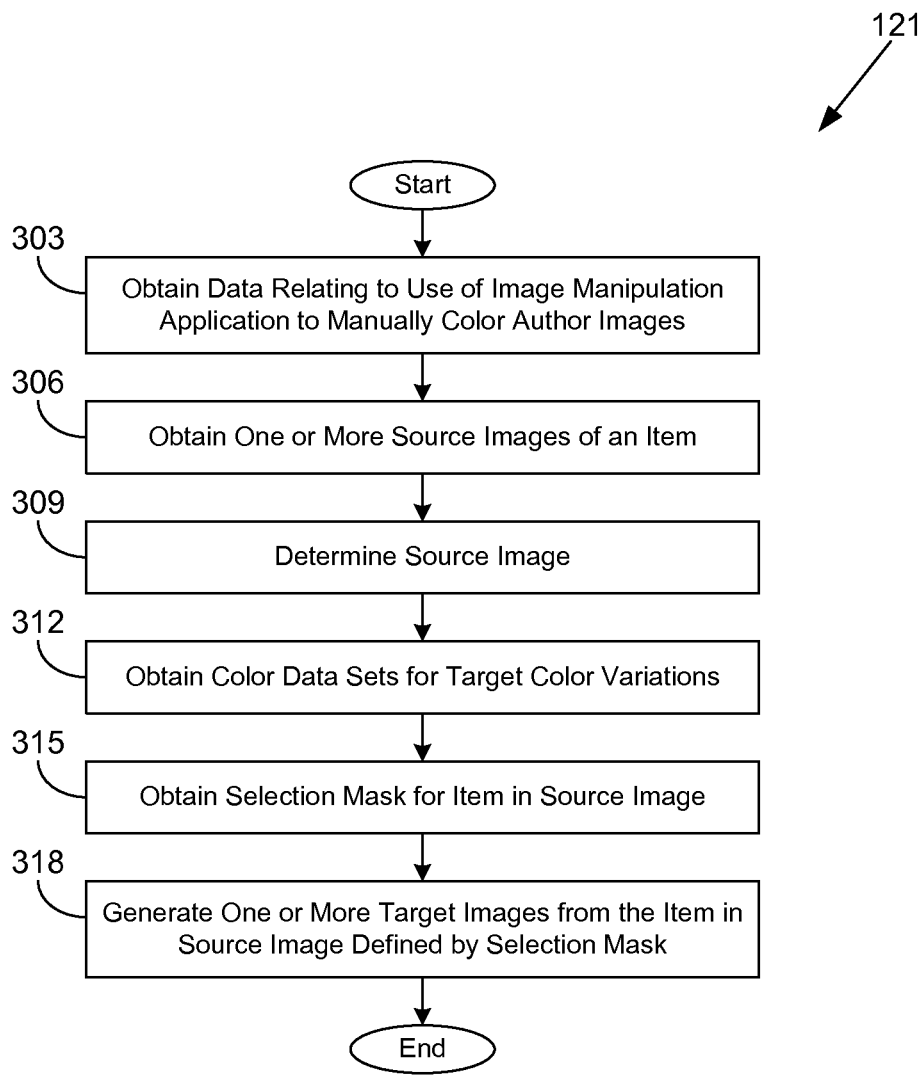
FIG. 3 is a flowchart illustrating one example of functionality implemented as portions of a color authoring application executed in a computing environment in the image generation environment of FIG. 1 according to various embodiments of the present disclosure.

Referring next to FIG. 3, shown is a flowchart that provides one example of the operation of a portion of the color authoring application 121 according to various embodiments. It is understood that the flowchart of FIG. 3 provides merely an example of the many different types of functional arrangements that may be employed to implement the operation of the portion of the color authoring application 121 as described herein. As an alternative, the flowchart of FIG. 3 may be viewed as depicting an example of steps of a method implemented in the computing environment 103 (FIG. 1) according to one or more embodiments.

Beginning with box 303, the color authoring application 121 obtains data relating to the use of the image manipulation application to manually color author images. This data may correspond, for example, to the color authoring rules 133 (FIG. 1) generated by the machine learning application 118 (FIG. 1) using, for example, the manual color data sets 136 (FIG. 1), the manual color transformation data 139 (FIG. 1), the manual source image selection data 142 (FIG. 1), the manual mask data 145 (FIG. 1), and/or other data.

In box 306, the color authoring application 121 obtains one or more source images 104 (FIG. 1) of an item originating in the model studio 105 (FIG. 1). The source images 104 may correspond to one or more color variations of the item. In box 309, the color authoring application 121 may determine one of the source images 104 for color authoring. The color authoring application 121 may determine more than one source image 104 to be used when one source image 104 cannot be used to color author all of the target images 124. In some cases, this selection of a source image 104 may be performed manually, or it may be performed automatically based at least in part on manual source image selection data 142. For example, the machine learning application 118 may determine that a certain color range is selected more often as a source image 104 for color transformations. The selection may also depend on the target color data sets 127 (FIG. 1).

In box 312, the color authoring application 121 obtains color data sets for the color variations to be used in generating one or more target images 124 (FIG. 1). The color data sets may be stored in the target color data sets 127. In some cases, a user may manually specify the target range of color values. Alternatively, the color authoring application 121 may analyze one or more color data set images 106 (FIG. 1) originating in the replicated studio 107 (FIG. 1) to determine the target range of color values. In some cases, the target range of color values may be determined from a source image 104 that has been designated as not to be used (i.e., where a target image 124 is to be generated for a color variation in place of a source image 104 for the same color variation).

In box 315, the color authoring application 121 obtains a selection mask 130 (FIG. 1) of the pixels corresponding to the item in the selected source image 104. In some cases, the selection mask 130 may be manually created by the user. In other cases, the selection mask 130 may be automatically generated based at least in part on the manual mask data 145. The user may verify and modify automatically generated selection masks 130 as desired.

In box 318, the color authoring application 121 generates one or more target images 124 from the item in the source image 104 as defined by the selection mask 130. To this end, the color authoring application 121 automatically transforms the item defined by the selection mask 130 to a respective color variation corresponding to one or more target images 124. In other words, the color authoring application 121 shifts one color value range to another color value range defined in the target color data sets 127. This transformation is based at least in part on data obtained from multiple previous manual color variation transformations for multiple items. Thereafter, the portion of the color authoring application 121 ends.

Figure 4:
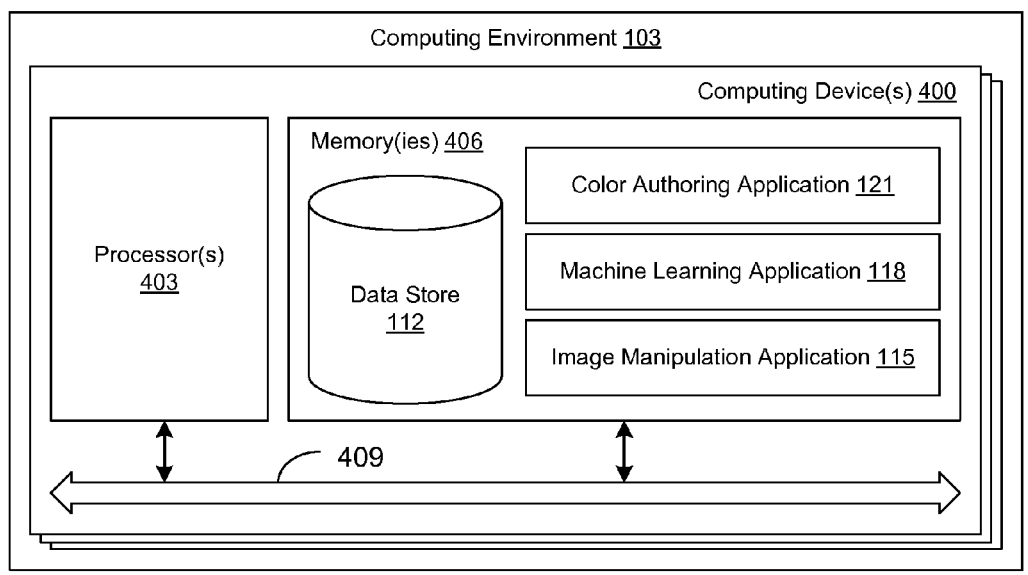
FIG. 4 is a schematic block diagram that provides one example illustration of a computing environment employed in the image generation environment of FIG. 1 according to various embodiments of the present disclosure.

With reference to FIG. 4, shown is a schematic block diagram of the computing environment 103 according to an embodiment of the present disclosure. The computing environment 103 comprises one or more computing devices 400. Each computing device 400 includes at least one processor circuit, for example, having a processor 403 and a memory 406, both of which are coupled to a local interface 409. To this end, each computing device 400 may comprise, for example, at least one server computer, client computer, or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the image manipulation application 115, the machine learning application 118, the color authoring application 121, and potentially other applications. Also stored in the memory 406 may be a data store 112 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the image manipulation application 115, the machine learning application 118, the color authoring application 121, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 3 shows the functionality and operation of an implementation of portions of the color authoring application 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the image manipulation application 115, the machine learning application 118, and the color authoring application 121, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A non-transitory computer-readable medium embodying a program executable in a computing device, wherein, when executed, the program causes the computing device to at least:
   obtain a source image of a garment which is modeled by a human model, the source image being photographically captured in a first studio, the source image of the garment corresponding to a first color variation of a plurality of color variations of the garment;
   obtain a color reference image of the garment corresponding to a second color variation of the plurality of color variations, the color reference image being photographically captured in a second studio configured to replicate a plurality of characteristics of the first studio;
   obtain a selection mask defining the garment in the source image;
   determine a range of color values of the second color variation of the plurality of color variations based at least in part on the color reference image and learned data generated by a machine learning application using manual data corresponding to a plurality of previous manual color variation transformations for a plurality of other garments; and
   generate a target image of the garment corresponding to the second color variation of the plurality of color variations by automatically transforming the garment defined by the selection mask in the source image to the second color variation of the plurality of color variations based at least in part on the range of color values and the learned data generated by the machine learning application.

2. The non-transitory computer-readable medium of claim 1, wherein the plurality of characteristics of the first studio include a lighting characteristic.

3. The non-transitory computer-readable medium of claim 1, wherein the manual data corresponding to the plurality of previous manual color variation transformations includes a plurality of adjustments using a color adjustment tool.

4. A system comprising:
   a physical data store that stores color authoring data; and
   at least one computing device in communication with the physical data store, the at least one computing device configured to at least:
   obtain a source image of a garment which is photographically captured, the source image of the garment corresponding to a first color variation of a plurality of color variations of the garment;
   obtain a selection mask defining the garment in the source image;
   determine a range of color values of a second color variation of the plurality of color variations based at least in part on learned data generated by a machine learning application using manual data corresponding to a plurality of previous manual color variation transformations for a plurality of other garments; and
   generate a target image of the garment corresponding to the second color variation of the plurality of color variations by automatically transforming the garment defined by the selection mask in the source image to the second color variation of the plurality of color variations based at least in part on the range of color values of the second color variation and the learned data.

5. The system of claim 4, wherein the at least one computing device is further configured to at least automatically determine the second color variation of the plurality of color variations based at least in part on an image of the garment corresponding to the second color variation of the plurality of color variations which is photographically captured.

6. The system of claim 4, wherein the at least one computing device is further configured to at least automatically determine the source image of the garment from a plurality of source images of the garment corresponding to the plurality of color variations of the garment based at least in part on the learned data generated by the machine learning application.

7. The system of claim 4, wherein the at least one computing device is further configured to at least generate a plurality of target images of the garment corresponding to the plurality of color variations of the garment.

8. The system of claim 4, wherein the garment defined by the selection mask in the source image includes a range of color values corresponding to the first color variation of the plurality of color variations.

9. The system of claim 4, wherein the manual data obtained from the plurality of previous manual color variation transformations includes a plurality of manual hue adjustments using a hue-saturation-brightness adjustment tool.

10. The system of claim 4, wherein the manual data corresponding to the plurality of previous manual color variation transformations includes a plurality of manual brightness adjustments using a hue-saturation-brightness adjustment tool.

11. The system of claim 4, wherein the selection mask is manually specified.

12. The system of claim 4, wherein the selection mask is automatically generated based at least in part on a background color of the source image.

13. The system of claim 4, wherein the source image depicts the garment being worn by a human model.

14. The system of claim 4, wherein the source image corresponds to a frame of a source video, and the target image corresponds to a frame of a target video.

15. A computer-implemented method comprising:
obtaining, in a computing system, a source image of a garment being modeled, the source image of the garment corresponding to a first color variation of a plurality of color variations of the garment;
obtaining, in the computing system, a selection mask defining the garment in the source image;
determining, in the computing system, a range of color values of a second color variation of the plurality of color variations based at least in part on learned data generated by a machine learning application using manual data corresponding to a plurality of previous manual color variation transformations for a plurality of other garments; and
generating, in the computing system, a target image of the garment corresponding to the second color variation of the plurality of color variations by automatically transforming the garment defined by the selection mask in the source image to the second color variation of the plurality of color variations based at least in part on the range of color values of the second color variation and the learned data generated by the machine learning application.

16. The computer-implemented method of claim 15, further comprising automatically determining, in the computing system, the second color variation of the plurality of color variations based at least in part on an image of the garment corresponding to the second color variation of the plurality of color variations which is photographically captured.

17. The computer-implemented method of claim 16, wherein the second color variation of the plurality of color variations is automatically determined based at least in part on a background color of the image of the garment corresponding to the second color variation of the plurality of color variations.

18. The computer-implemented method of claim 15, further comprising automatically determining, in the computing system, the source image of the garment from a plurality of source images of the garment corresponding to the plurality of color variations of the garment based at least in part on the learned data generated by the machine learning application.

19. The computer-implemented method of claim 15, wherein generating the target image is repeated to generate a plurality of target images of the garment corresponding to the plurality of color variations.

20. The computer-implemented method of claim 15, wherein the manual data corresponding to the plurality of previous manual color variation transformations includes a plurality of adjustments using a hue-saturation-brightness adjustment tool.

21. The computer-implemented method of claim 15, further comprising automatically generating, in the computing system, the selection mask based at least in part on a background color of the source image.

* * * * *